United States Patent

[11] 3,614,529

[72] Inventor Joseph E. Nanevicz
 Palo Alto, Calif.
[21] Appl. No. 12,328
[22] Filed Feb. 18, 1970
[45] Patented Oct. 19, 1971
[73] Assignee The United States of America as
 represented by the Secretary of the Air
 Force

[54] LOW-NOISE CORONA DISCHARGE DEVICE
 2 Claims, 5 Drawing Figs.
[52] U.S. Cl. ................................................ 317/2 E
[51] Int. Cl. ................................................ H05f 3/06
[50] Field of Search ................................... 317/2 E, 2 R

[56] References Cited
 UNITED STATES PATENTS
3,106,663 10/1963 Tanner ...................... 317/2 E
3,170,087 2/1965 Tanner et al. ................. 317/2 E OTHER REFERENCES
Article " A New Aircraft Static Discharger" by R. L. Tanner in IRE National Convention 1957 Vol. 5 No. 8

Primary Examiner—J. D. Miller
Assistant Examiner—Harry E. Moose, Jr.
Attorneys—Harry A. Herbert, Jr. and Arsen Tashjian ABSTRACT: A static-discharger system for achieving corona discharge noise reduction including a dielectrically decoupled discharger having a body made of high dielectric constant material suspended aft of the trailing edge of the aircraft wing. One or more discharge pins are located at positions along the minimum coupling line on the body. The discharge pins are connected to the airframe via a high-resistance band that extends aft only as far as the discharging pin.

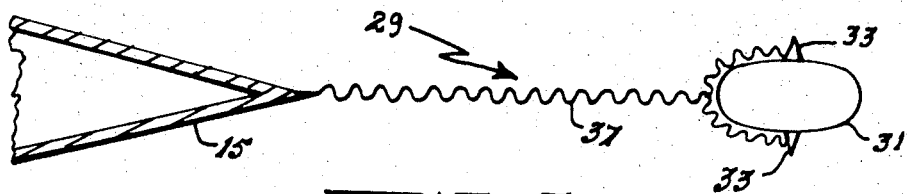
FIG. 3
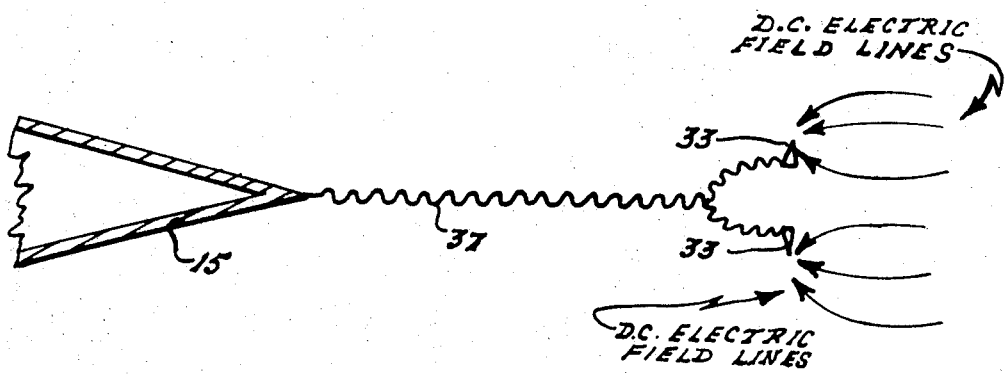
FIG. 4-B
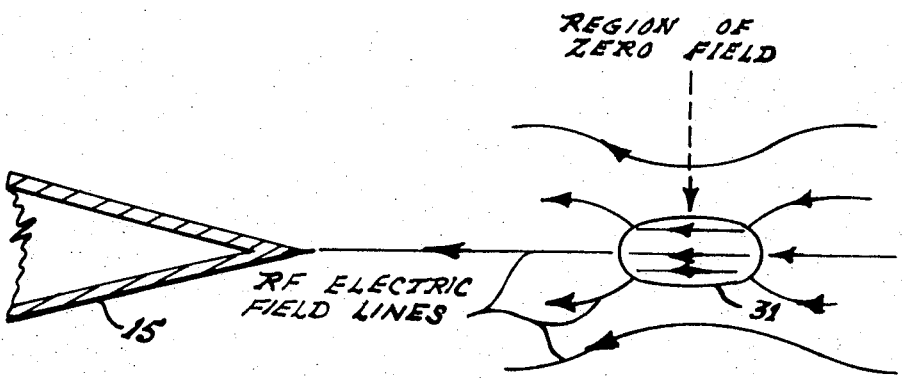
FIG. 4-A

3,614,529

LOW-NOISE CORONA DISCHARGE DEVICE

BACKGROUND OF THE INVENTION

The invention relates to static-discharger systems and, more particularly, the invention is concerned with an improved system wherein radio interference arriving from static-discharge is minimized.

The accumulation of electrostatic charge generated in aircraft from "frictional" effects and atmospheric conditions gives rise to a number of operational difficulties including radio interference with aircraft communication and navigation systems as well as the possibility of spark ignition of fuel-impregnated air and the premature detonation of externally carried weapons and explosives.

The importance and severity of the charging processes which produce the electrostatic charge is dependent upon the type of aircraft under consideration and its mission profile. It has been determined that the magnitude of the charging current with the resultant effect on communication noise, personal hazards, ignition sparking of fuel-air mixture and corona ignition of explosives, is directly related to aircraft size and operation/environment.

Noise or communication "hash" is a consequence of uncontrolled discharge taking place through natural corona points of a charged aircraft. Since the corona phenomenon is essentially a discontinuous process, it produces a radio frequency field of wise spectral band. The charge transfer between corona points and the space charge takes place in small bursts having rise and decay times in the order of several nanoseconds and magnitudes of a few micromicrocoulombs. The harmonic content of such a pulse is normally high and, consequently, so is the resultant radiated field strength.

Not only must an aircraft electrostatic discharging system channel all the required discharging current through its high voltage corona point probes, but also the design of these probes must be such that the interference noise generation is minimized. Another factor affecting the generation and propagation of the noise created in the discharging device consists of its location on the aircraft with respect to the antennae and noise-sensitive elements of the communication and navigation systems.

The prior conventional static electricity dissipating systems for aircraft fall into two general categories: the first approach is to reduce the noise generated by the corona discharge source and, second, to minimize the electromagnetic coupling between the source and the receiving systems on the aircraft. Both systems have been used extensively on aircraft and both employ decoupling and source noise reduction to various degrees.

In the first prior art system (illustrated in FIG. 1), the wick discharger functions by causing the static current to be discharged from high-resistance fibers located in the region of reduced noise coupling several inches aft of the trailing edge of the wing. Although some of the corona noise reduction afforded by a wick results from noise-coupling reduction, the wick relies primarily on the fine high-resistance fibers to modify the corona discharge processes to reduce the noise generated by the discharge. The fine fibers required to make the wick function properly are not able to withstand the jet aircraft environment making it impractical to use wicks on jets.

The second widely used system is called the ortho-decoupled discharger and functions by causing the static discharge to occur in the region of minimum noise coupling about an isolated conductor (illustrated in FIG. 2). In this case, some noise reduction results from the use of a fine pin to discharge the current, while most of the noise reduction stems from reducing the coupling between the corona noise source and the antenna. Although the ortho-decoupled discharger lends itself to good mechanical design and provides adequate sound reduction, the requirement of a conducting body to generate the low noise coupling region imposes certain practical limitations. For example, the part of the conducting body extending aft of the minimum coupling position tends to shield the discharging pin and raise the discharger corona threshold above the value that could be achieved if the pin were not surrounded by the conducting body. The requirement of conducting material on both sides of the discharging pin further complicates the fabrication of ortho-decoupled dischargers in that in practice it is found necessary to cap with plastic the aft end of the conducting body to prevent undesirable corona discharges from it.

In a two-dimensional embodiment of the ortho-decoupled discharger (not shown) wherein part of the airfoil trailing edge is removed and replaced with an isolated conducting body, the existence of the isolated conducting body along the airfoil trailing edge means that lightning currents from strokes to the outboard part of the wing can be returned to the airframe at points inboard along the wing with consequent damage to the airfoil and conducting body at several locations along the wing.

SUMMARY OF THE INVENTION

The present invention provides a superior means for achieving corona discharge noise reduction. It can be differentiated from the above-described prior art devices in certain respects and will be called a dielectrically decoupled discharger. The invention includes a body made of high dielectric constant material which is suspended aft of the trailing edge of the wing. One or more discharge pins are located at positions along the minimum coupling line on the body. The discharge pins are connected to the airframe by means of a high-resistance band that extends aft only as far as the discharging pin.

Accordingly, it is an object of the invention to provide an aircraft static discharging system wherein the radio interference produced by static discharge is minimized.

Another object of the invention is to provide an aircraft static-discharging system in which the electromagnetic coupling between the noise sources of the antistatic system and the antennae of the communications and navigation receivers is minimal.

Still another object of the invention is to provide a dielectrically decoupled discharger for aircraft wherein an isolated dielectric body which has no conductor aft of discharge pins thereon forcing the electric field lines to terminate on the pins themselves and thereby reduce the corona threshold to a low value.

A further object of the invention is to provide an electrostatic discharging system wherein the high resistance band connecting the pins on the dielectric body to the bias supply can be buried inside the body thereby protecting personnel from electric shock and preventing undesirable discharges from occurring from materials other than the discharge pins.

A still further object of the invention is to provide a low-noise corona discharge device which includes a dielectrically decoupled discharger having no plastic end caps thereby simplifying production. Also, since there is no conductor aft of the pins, relatively short pins can be used to achieve an acceptable corona threshold, thus reducing the hazard of injury from the pins.

Another still further object of the invention is to provide a low-noise corona discharge device which is easily and economically produced and is sturdy in construction while being highly effective and efficient in operation.

These and other objects, features and advantages will become more apparent after considering the description that follows and from the drawings wherein like numbers are used throughout to identify like elements.

DESCRIPTION OF THE DRAWINGS

FIG. 3 is a view in schematic of a dielectrically decoupled discharger according to the invention;

FIG. 4A is an illustration of the generation of zero field region on the isolated dielectric body of the dielectrically decoupled discharger of FIG. 3; and FIG. 4B is an illustration of the DC field structure about the discharge pins of the dielectrically decoupled discharger shown in FIG. 3.

DESCRIPTION OF A PREFERRED EMBODIMENT

Figure 1:
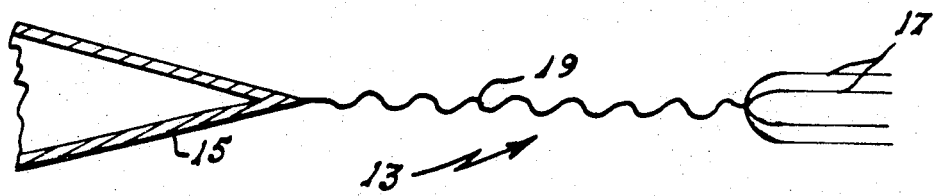
FIG. 1 is a view in schematic of a prior art wick discharger mounted on an aircraft.

Referring now to FIG. 1, there is shown a conventional prior art wick discharger 13 mounted on an airfoil trailing edge 15. The wick discharger 13 functions by causing the static current to be discharged from high-resistance fibers 17 located in the region of reduced noise coupling several inches aft of the trailing edge 15. A high-resistance connection 19 provides a path for the static current to follow. Although some of the corona noise reduction afforded by a wick results from noise-coupling reduction, the wick discharger 13 relies primarily on the fine high-resistance fibers 17 to modify the corona discharge processes to reduce the noise generated by the discharge. The fine fibers 17 required to make the wick discharger 13 function properly are not able to withstand the jet aircraft environment, consequently the discharger 13 is not usable on jets.

Figure 2:
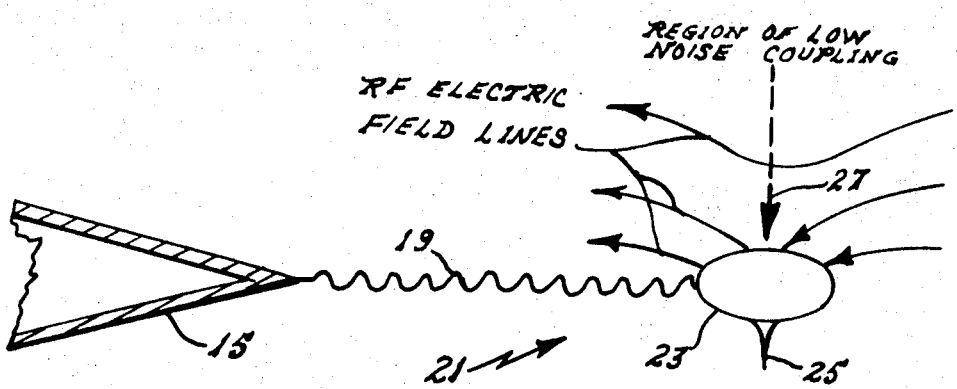
FIG. 2 is a view in schematic of a prior art ortho-decoupled discharger mounted on an aircraft.

The prior art ortho-decoupled discharger 21 shown in FIG. 2 functions by causing the static discharge to occur in the region of minimum noise coupling about an isolated conductor 23, which is connected to the airfoil trailing edge 15 by means of the high-resistance connection 19. In this case, while some noise reduction results from the use of a fine pin 25 to discharge the current, most of the noise reduction stems from reducing the coupling between the corona noise source and the antenna. The requirement of the conducting body 23 to generate low noise coupling imposes certain practical limitations on the ortho-decoupled discharger 21. The part of the conducting body 23 extending aft of the minimum coupling position 27 tends to shield the discharging pin 25 and raises the discharger corona threshold above the value that could be achieved if the pin 25 were not surrounded by the conducting body 23. The requirement of conducting material on both sides of the conducting pin 25 further complicates the fabrication of ortho-decoupled dischargers 21 in that, in practice, it is found necessary to cap with plastic the aft end of the conducting body 23 to prevent undesirable corona discharges from it.

The dielectrically-decoupled discharger 29 according to the invention is shown in FIG. 3. A body 31 of high dielectric constant material is suspended aft of the trailing edge of the wing. One or more discharge pins 33 are located at positions along the minimum coupling line on the body 31. The discharge pins 33 are connected to the airframe by means of a high-resistance band 37 that extends aft only as far as the discharge pins 33.

Functioning of the dielectrically decoupled discharger 29 can be explained by reference to FIGS. 4A and 4B. When an isolated dielectric body is placed in an RF field, the field structure is modified as shown in FIG. 4A. A region of zero field exists about the body 31 as indicated. By reciprocity, RF noise generated in this region will not couple into receiving systems. The corona discharge is caused to occur at this point of minimum coupling by locating the discharge pin 33 here. The discharge current is conducted to the pin without modifying the RF coupling field structure by connecting the pin to the airfoil with the band of high-resistance conducting material 37.

To the DC fields, the dielectrically decoupled discharger 29 has the appearance of FIG. 4B. Note that there is no conductor aft of the discharge pins 33 so that the DC electric field lines are forced to terminate on the pins themselves thereby reducing the corona threshold of the device to a low value. A low corona threshold is a very important consideration in the design of a static discharger.

In the two dimensional embodiment of the inventive concept (not shown), the device consists of a row of pins mounted in a dielectric bar along the trailing edge of the airfoil. Since it is not necessary to employ a conducting body to produce the low coupling region, the pins may be connected together with high-resistance strips. In this way, at the high frequencies associated with lightning leaders, the pins will be uncoupled and strokes will not propagate along the discharger. In the case of active discharger systems, the dielectrically decoupled discharger is very attractive in that the high-resistance band connecting the pins to the bias supply can be buried inside the dielectric body. This serves to protect personnel from electric shock, and also prevents undesirable discharge which might otherwise occur from conducting materials other than the discharge pins.

Although the invention has been illustrated in the accompanying drawings and described in the foregoing specification in terms of preferred embodiments thereof, the invention is not limited to these embodiments or to the preferred configurations mentioned. The specific mention made here to applications involving aircraft corona discharge noise reduction is for the sake of illustration. It will be apparent to those skilled in the art that my invention will find application in all instances where RF noise generated by corona discharge poses a problem. Also, it should be understood that various changes, alterations, modifications and substitutions, particularly with respect to the construction details, can be made in the arrangement of the several elements without departing from the true spirit and scope of the appended claims.

Having thus described my invention, what I desire to secure by Letters Patent of the United States is:

1. A static-discharger system for achieving reduction of corona discharge noise comprising a body member suspended aft of the trailing edge of an aircraft wing, said body member being fabricated of material having a high dielectric constant and having its free end uncapped, at least one discharge pin extending outwardly from said body member, and a high-resistance band operatively connected between the aircraft wing trailing edge and said discharge pin, said high-resistance band extending aft only as far as said discharge pin thereby forcing the DC electric field lines to terminate on said discharge pins and reduce the corona threshold to a low value.

2. The static-discharger system defined in claim 1 wherein a plurality of said discharge pins are located on said body member in the region of minimum noise coupling, each of said discharge pins being operatively connected to the aircraft wing trailing edge of said high-resistance band.